Feb. 17, 1970 R. W. LANGE 3,495,961
METHOD AND APPARATUS FOR VITREOUS BEAD MANUFACTURE
Filed Dec. 27, 1966 3 Sheets-Sheet 1

Feb. 17, 1970      R. W. LANGE      3,495,961

METHOD AND APPARATUS FOR VITREOUS BEAD MANUFACTURE

Filed Dec. 27, 1966      3 Sheets-Sheet 3

United States Patent Office 3,495,961
Patented Feb. 17, 1970

3,495,961
METHOD AND APPARATUS FOR VITREOUS BEAD MANUFACTURE
Rolf W. Lange, Waldwick, N.J., assignor to Potter Brothers, Inc., Carlstadt, N.J., a corporation of New York
Filed Dec. 27, 1966, Ser. No. 604,844
Int. Cl. C03b 19/10, 37/00
U.S. Cl. 65—21    9 Claims

ABSTRACT OF THE DISCLOSURE

A method of and apparatus for the manufacture of glass beads in which a falling molten stream of glass is struck in rapid succession by the fins of a rotatable chopper wheel to disperse the stream into tiny particles and to fling them into a path of long trajectory. The particles are heated sufficiently during the first portion of their flight to enhance their formation into spheres by surface tension, this heating occurring in a heated zone being maintained by burners mounted in a substantially diametrically opposed relationship with each other, the heat from said burners being kept away from said rotatable chopper wheel. During the latter part of the flight, the spherical particles or beads are cooled by the atmosphere and solidified to then land in a collecting zone. A liquid quench may be located at the collecting zone.

BACKGROUND OF THE INVENTION

This invention falls in the field of glass bead manufacture and more particularly in that part of this field concerned with the making of beads, balls, granules and the like from a stream of molten glass.

Heretofore, glass beads have been made by introducing glass particles into a flame in a draft tube or stack as disclosed in R. H. Potters Patent 2,334,578 issued Nov. 16, 1943. Other known methods of making glass beads include blowing a stream of gas, such as air, against a stream of molten glass to disperse the glass into discrete particles. One such method is disclosed in Wood, Nylander and Hackett U.S. Patent 3,279,905 issued Oct. 18, 1966. In some cases, supplemental heat is applied to the dispersed particles, as disclosed, for example, in copending U.S. application Ser. No. 804,466, filed Apr. 6, 1959 by F. O. Hess, which was granted on Dec. 27, 1966 as U.S. Patent 3,294,511

SUMMARY

It is proposed in accordance with the method and apparatus of this invention to mechanically disperse molten material and further heat and then cool it to form tiny solid spheres of glass or other suitable material. This mechanical dispersion is effected by means of a rotating multiple finned striker or chopper wheel interposed in a molten stream of the material being employed.

Briefly, in outline, the process and apparatus for making beads as applied to glass comprises melting the glass and allowing it to flow in a thin stream to strike on the fins of a rotating chopper wheel. This breaks the stream into particles and flings a stream of them outwardly for a great distance. Immediately after leaving the wheel, the particles pass through a heater, which has been placed in their path. The heater maintains the softness of the glass sufficiently to permit surface tension to form the particles into generally spherical bodies or beads. Upon leaving the heater, the spheres continue in their path through the atmosphere long enough to allow cooling and freezing so that solid beads fall out of the path, if desired into a quenching medium to be further cooled. The now solid, and cool beads are transported to storage or to a place at which they are to be used.

BRIEF DESCRIPTION OF DRAWINGS

It is believed that the objects and features of this invention will appear more fully in the following description of an exemplary embodiment thereof when considered in connection with the appended drawings, in which.

DESCRIPTION OF A PREFERRED EMBODIMENT

As previously indicated, the particular description of an embodiment of this invention will be set forth in terms of forming molten glass into glass beads.

Figure 1:
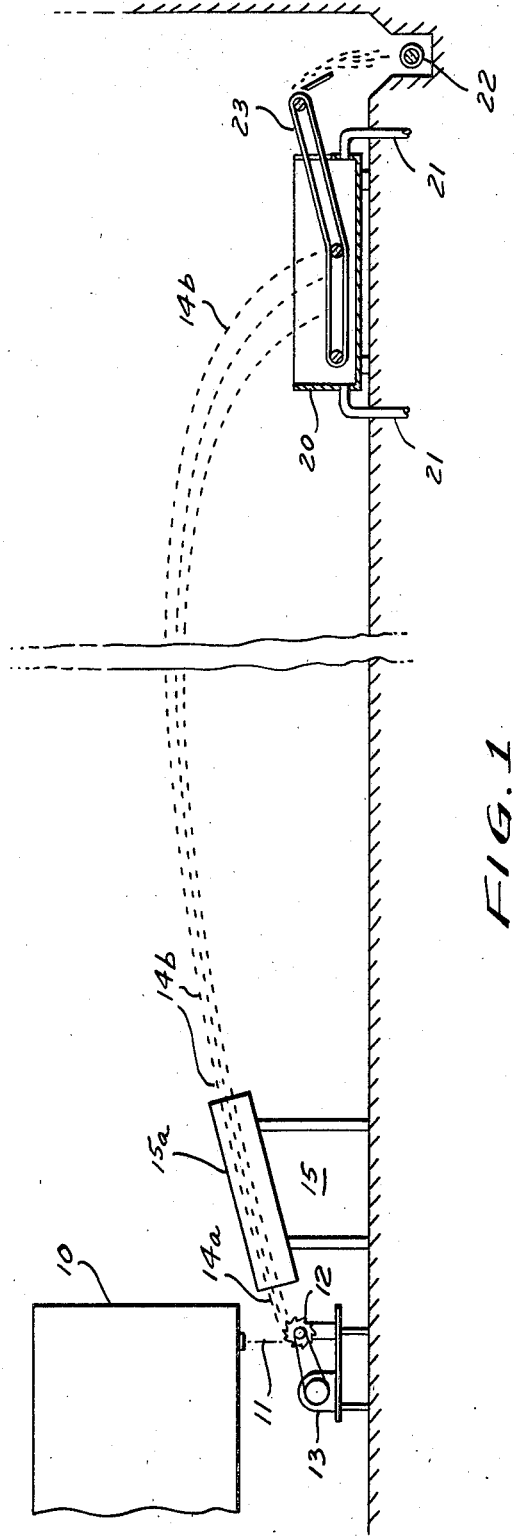
FIG. 1 is a generalized somewhat schematic view in elevation of apparatus used to perform the process herein contemplated.
Figure 2:
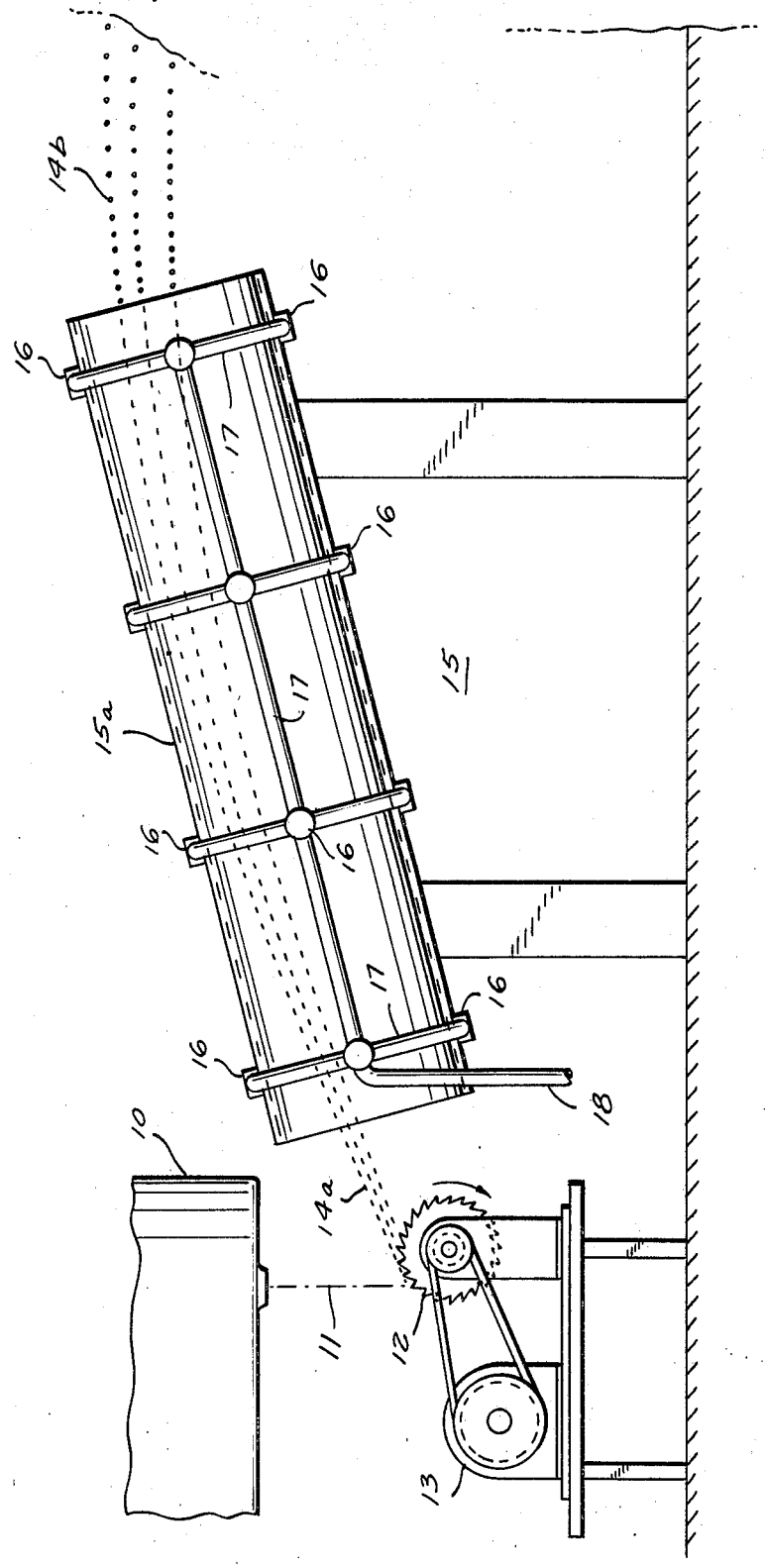
FIG. 2 is a fractional enlarged view based on FIG. 1 and showing a portion thereof to illustrate various details of the apparatus elements and their arrangement.

Referring to FIGURES 1 and 2, a glass melting tank or other supply receptacle 10 is provided with a circular orifice to allow a stream of molten glass 11 to flow downwardly in a vertical direction toward the dispersing means 12 driven by the motor 13. The dispersing means 12 is a multifinned rotatable disc which may be called a chopper wheel. This wheel will be more particularly described subsequently. The molten glass impinging upon the periphery of the rotating wheel 12, which is here indicated as revolving clockwise, is broken into a stream 14a of discrete particles or droplets. The stream of particles passes through a heater 15 which maintains sufficient heat in this zone to maintain the particles soft enough to be formed into spheres 14b by surface tension.

Because of the force supplied by the fins of the chopper wheel 12, the little spheres or spheroids after leaving the heater proceed through the atmosphere far enough to permit them to cool and to solidify. By now the force is spent and the particles fall, preferably into a quenching hopper 20.

The bath in the hopper may be an appropriate quenching medium of water, ethylene or propylene glycol solution, quenching oil, or various other suitable materials. The hopper may be connected to a suitable cooling apparatus such as a heat exchanger, by the pipes 21. The quenched beads may be transferred to a conveyor 22 by a transporter represented at 23, the beads to be moved by the conveyor to any desired locality.

As best shown in FIG. 2, the heater 15 comprises a tube 15a having heater elements in the form of low velocity burners 16 distributed over its surface. The burners 16 are connected together by conduits 17 and to a suitable source of natural gas by a feeder 18. In the illustrated embodiment the burners 16 advantageously are disposed in diametrically opposed relationship with each other to maintain any turbulence within the tube 15a at a minimum. The tube 15a may be of steel or other suitable material. If desired, heat may be supplied at the entrance end of the tube by means of one or more additional burners to promote a unidirectional flow of hot combustion gases through the tube and thereby further enhance the distribution of heat therein. The flow induced by these burners also serves to keep heat from the tube away from the chopper wheel 12 and to concentrate the heat in the downstream portion of the tube.

Figure 3:
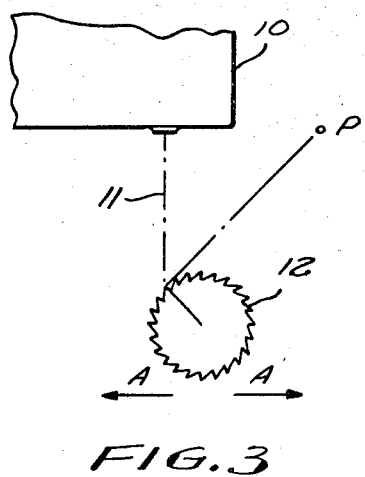
FIG. 3 is a schematic view to illustrate suitable relative positions of parts of the apparatus.

As best illustrated in FIG. 3, the stream of molten glass 11 impinges on the chopper wheel 12 at a rising portion thereof. The wheel may be horizontally adjustable, as indicated by the arrows A—A, to allow for variation of the point of impingement. Since a given particle P is projected tangentially from the periphery of the chopper 12, the point of impingement should be such as to provide a proper trajectory. Assuming clockwise rotation, in several advantageous embodiments this point should be between 10 and 11 o'clock, say 10:30, for median operation, with the result that the particles are flung through the heater 15 and far enough beyond to cool and freeze prior to quenching. If relatively large beads are being made, the trajectory should be lengthened to allow more cooling time.

The size of the beads is a function of the number of teeth passing the impact point in a given time, the greater number giving smaller beads and vice versa. The bead size also may be varied by controlling the size of the discharge orifice to adjust the flow rate of the glass. Although variations in flow rate do not have as pronounced an effect on the size of the beads as variations in the speed of the chopper wheel 12, by decreasing the flow rate there is produced a corresponding decrease in bead size and vice versa.

Heretofore, difficulties were encountered in the manufacture of beads in some of the larger sizes, and these difficulties were of special moment in processes of the type which relied upon the draft produced by a vertical tube or stack to support the beads during spheroidization. By appropriate adjustment of the glass flow rate and the speed of the chopper wheel 12, however, satisfactory beads may be produced which have a diameter as large as 0.20 inch and even larger. In general, the illustrated embodiment of the invention is effective to provide beads in a wide range of sizes which may vary from about 0.025 inch to about 0.20 inch, with the result that the system has considerably greater flexibility than prior bead-making systems.

Figure 4:
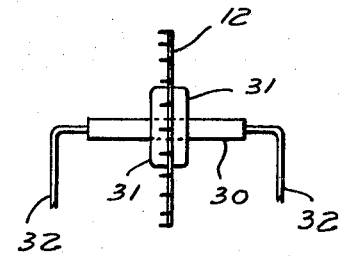
FIG. 4 is a representation of means for cooling the chopper wheel.

If desired, the wheel axle may be made hollow so that cooling fluid may be passed through it. As shown in FIG. 4, a hollow axle 30 is secured to the wheel 12 with water-tight rotating couplings 31 or the like and is connected to a source of coolant by the hoses or pipes 32.

Figure 5:
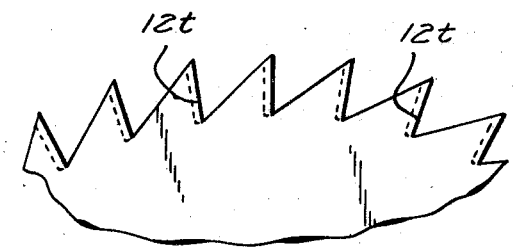
FIG. 5 is an elevational view of a portion of a chopper wheel used for glass dispersion.
Figure 6:
FIG. 6 is a view of the wheel portion shown in FIG. 5 as seen from above in that figure.

The teeth 12t of the chopper wheel 12 shown in elevation in FIGS. 2, 3 and 5 have an axial dimension which advantageously is at least as great and preferably somewhat larger than the diameter of the molten glass stream at the point at which the stream comes in contact with the wheel. The wheel 12 closely resembles a circular saw blade. It will be noted, however, that the material between the teeth 12t is bent out as seen in FIG. 6 so that each tooth projects angularly from and is substantially perpendicular to the face of the wheel disc. The wheel periphery may be formed in other configurations, the criterion being the ability to chop the molten stream into particles and to project them into a sufficiently long path to allow cooling and solidifying en route from the spherodizing heater to the collecting area.

Figure 7:
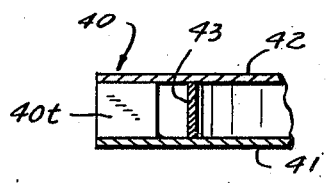
FIG. 7 is a diametric sectional view of a portion of an alternative chopper wheel useful in connection with the invention.

In the embodiment shown in FIGS. 1–6, the teeth or fins 12t on the chopper wheel 12 are triangular in shape. In other advantageous embodiments, square or rectangular teeth are employed, again with good effect. As an illustration, FIG. 7 is illustrative of a chopper wheel 40 which is provided with square teeth 40t. The wheel 40 is fabricated from two circular discs 41 and 42 which are arranged in parallel, coaxial relationship with each other and are spaced apart by a distance at least equal to the diameter of the molten glass stream at the point of impact. The teeth 40t are bent inwardly from the disc 41 at a right angle and are welded to the disc 42. To avoid the entrainment of ambient air toward the molten glass from adjacent the axis of the wheel, a barrier in the form of a ring member 43 is interposed between the discs 41 and 42 intermediate the axis and the teeth 40t.

One of the advantages of the present mechanical chopping system is that glass beads may be formed directly from a stream of molten glass which is of somewhat higher viscosity than that employed by some of the prior processes utilizing a blast of gas to disperse the stream. Thus, although the viscosity of the stream is sufficiently low to permit it to flow readily from the discharge orifice of the melting tank, it may range as high as fifty poises and even higher without producing substantial quantities of glass wool or other undesirable by-products. As a result, the temperature of the molten glass at the point of dispersion need not be as high as that employed in such prior processes and may range from about 2100° F. to about 2400° F. even for some of the more viscous glasses. The combined action of the mechanical chopper wheel and the heated chamber enables the production of satisfactory beads from soda lime glass as well as from the various other types of glass currently used in the bead manufacturing field.

Of course, the system works equally well for some of the less viscous glasses or in cases in which the glass is heated to a higher temperature. In some embodiments of the invention under these latter conditions, the dispersing action of the mechanical chopper by itself may serve to break up the stream sufficiently to enable surface tension to form the spheres, and a satisfactory product may be produced without the use of the heated chamber. Among its other advantages, the chopper avoids the undesirable cooling effect which often resulted from prior processes of the type which used a blast of compressed air, for example, to disperse the stream.

The terms and expressions which have been employed are used as terms of description and not of limitation, and there is no intention, in the use of such terms and expressions, of excluding any equivalents of the features shown and described, or portions thereof, it being recognized that various modifications are possible within the spirit and scope of the invention.

What is claimed is:

1. A process for preparing substantially spherical glass beads which comprises providing a free falling stream of molten glass, making contact with the stream by means of a multiple striker to thereby disperse the glass into droplets, the temperature of the molten stream being within the range of from about 2100° F. to about 2400° F. at the time it contacts the striker, passing the droplets through a substantially enclosed heating zone to enhance their formation into spheroids by surface tension, further projecting the spheroids a distance sufficient to let them cool and solidify, and collecting the resulting beads.

2. A process as defined by claim 1 further comprising the step of quenching the spheroids after they have solidified.

3. The method of making small glass beads that comprises discharging molten glass bead material in a thin stream from a small orifice in a glass supply receptacle, mechanically striking said stream by a rotating chopper wheel to break up the stream into particles, passing the particles through a heated zone to maintain a sufficient softness of the particle surface to allow the formation of spheroids by surface tension, said heated zone being maintained by burners mounted in a substantially diametrically opposed relationship with each other, the heat from said burners being kept away from said rotating chopper wheel, discharging said particles from said heated zone to a cooling zone to allow subsequent cooling and solidification of the spheroids, and collecting these spheroids.

4. The method of forming small glass beads that comprises melting glass, discharging said glass in a thin continuous molten stream, striking the stream successive blows to mechanically disperse the stream into another stream of discrete particles, the temperature of the molten stream being within the range of from about 2100° F. to about 2400° F. at the time it is dispersed, heating this latter stream in a substantially enclosed measured zone, and then discharging the particles from the heating zone to a cooling zone open to the ambient atmosphere, to allow the particles to become spherical by surface tension and to solidify during their passage through the cooling zone, and collecting the resulting beads.

5. The method of making tiny spherical glass bodies that comprises providing a source of molten body-forming glass material, discharging a fine stream of such material into a preassigned zone, mechanically striking the stream in that zone in rapid succession to disperse the material into discrete particles and to project them in a stream of such particles, passing the stream of particles through a heated zone to maintain a sufficient softness of the particle surface to allow the formation of spheroids by surface tension, said heated zone being maintained by burners mounted in a substantially diametrically opposed relationship with each other, the heat from said burners being kept away from said mechanical striking zone, discharging said particles from said heated zone to a cooling zone to allow subsequent cooling and solidification of the spheroids, and collecting these spheroids.

6. Apparatus for making tiny glass spheres comprising a receptacle for molten sphere-forming glass material, the receptacle having means defining an orifice for allowing the material to flow therefrom, a rotatable chopper wheel in position to contact the material flowing from said orifice, means for rotating the wheel to disperse the material into a stream of particles, the impact of the wheel being sufficient to throw the particles a long distance, means defining a heated chamber having a cylindrical surface positioned along a portion of the stream of the dispersed particles, means for maintaining the particles at an elevated temperature, to allow their formation into spheres under surface tension, said last-mentioned means including a plurality of burners mounted on the inside cylindrical surface of the chamber in a substantially diametrically opposed relationship with each other, the heat from said burners being kept away from said rotatable chopper wheel, and means for collecting the spheres in solid form at the end of their trajectory.

7. Apparatus for making small glass beads comprising a source of molten glass bead-forming material for discharging a thin stream of the molten glass material, a chopper wheel on a horizontal axis which is located to position the wheel in the path of the stream, means for rotating the wheel to fling the material outwardly in a stream of discrete particles, means defining a heated chamber having a cylindrical surface positioned along a portion of said stream of discrete particles, means for maintaining the particles at an elevated temperature, to allow their formation into spheroids under surface tension, said last-mentioned means including a plurality of burners mounted on the inside cylindrical surface of the chamber in a substantially diametrically opposed relationship with each other, the heat from said burners being kept away from said rotatable chopper wheel, quenching means for receiving the spheroids for further cooling, and means for collecting the resulting beads.

8. Glass bead-making apparatus for dispersing molten glass into discrete particles that comprises a source of molten glass for emitting a thin stream of molten glass downwardly, a rotatable chopper wheel in the path of the glass stream oriented to strike the stream intermittently to disperse it into a multiplicity of discrete particles, means defining a heated chamber having an inner surface positioned along a portion of said multiplicity of discrete particles, means for maintaining the particles at an elevated temperature, to allow their formation into spheres under surface tension, said last-mentioned means including a plurality of burners mounted on said inner surface of the chamber in a substantially diametrically opposed relationship with each other, the heat from said burners being kept away from said rotatable chopper wheel, and means for collecting the spheres in solid form at the end of their trajectory.

9. Apparatus for producing glass beads comprising a glass melting tank having means defining a discharge orifice for permitting the glass to flow therefrom in a molten glass stream, means including a rotary chopper wheel in position to contact the molten glass stream at a predetermined impact point, the chopper wheel having a series of teeth disposed along its periphery for striking the stream in rapid succession at the impact point and having barrier means for preventing the flow of ambient air past the teeth to the molten glass, means for rotating the chopper wheel to disperse the molten glass stream into a multiplicity of glass particles and to direct the particles into a space for a distance sufficient to enable their formation into glass beads by surface tension, means defining a heated chamber having a cylindrical surface positioned along a portion of said multiplicity of the glass particles, means for maintaining the particles at an elevated temperature, to allow their formation into spheres under surface tension, said last-mentioned means including a plurality of burners mounted on the inside cylindrical surface of the chamber in a substantially diametrically opposed relationship with each other, the heat from said burners being kept away from said rotary chopper wheel, and means for collecting the spheres in solid form at the end of their trajectory.

References Cited

UNITED STATES PATENTS

| | | | |
|---|---|---|---|
| 2,619,776 | 12/1952 | Potters | 65—21 |
| 3,133,805 | 5/1964 | Robinson | 65—21 |
| 3,148,045 | 9/1964 | Schott | 65—21 |
| 3,293,014 | 12/1966 | Callander | 65—21 |
| 3,310,391 | 3/1967 | Law | 65—21 |

S. LEON BASHORE, Primary Examiner

E. R. FREEMAN, Assistant Examiner

U.S. Cl. X.R.

65—142